(12) United States Patent
Krishnamoorthy et al.

(10) Patent No.: US 11,379,748 B2
(45) Date of Patent: Jul. 5, 2022

(54) SYSTEM FOR THRESHOLD DETECTION USING LEARNING REINFORCEMENT

(71) Applicant: BANK OF AMERICA CORPORATION, Charlotte, NC (US)

(72) Inventors: Madhusudhanan Krishnamoorthy, Chennai (IN); Ayesha Farha AmeerHamza, Chennai (IN); Abhiraam Venkatesan, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 285 days.

(21) Appl. No.: 16/901,403

(22) Filed: Jun. 15, 2020

(65) Prior Publication Data
US 2021/0390438 A1 Dec. 16, 2021

(51) Int. Cl.
*G06N 7/02* (2006.01)
*G06N 7/06* (2006.01)
*G06N 5/04* (2006.01)
*G06N 20/00* (2019.01)

(52) U.S. Cl.
CPC .............. *G06N 7/02* (2013.01); *G06N 5/04* (2013.01); *G06N 7/06* (2013.01); *G06N 20/00* (2019.01)

(58) Field of Classification Search
CPC .. G06N 7/02; G06N 5/04; G06N 7/06; G06N 20/00; G06N 3/006; G06N 7/005
See application file for complete search history.

(56) References Cited

U.S. PATENT DOCUMENTS

| | | | |
|---|---|---|---|
| 8,768,870 B1 | 7/2014 | Corrado et al. | |
| 9,347,288 B2* | 5/2016 | Clemens | E21B 44/00 |
| 9,401,148 B2 | 7/2016 | Lei et al. | |
| 9,787,745 B1 | 10/2017 | Binns et al. | |
| 9,852,230 B2 | 12/2017 | Fleury et al. | |
| 9,858,534 B2 | 1/2018 | Abu-Mostafa et al. | |
| 9,953,281 B2 | 4/2018 | Wiig et al. | |
| 10,223,616 B1 | 3/2019 | Malin et al. | |
| 10,225,360 B1 | 3/2019 | Sosna et al. | |
| 10,235,625 B1 | 3/2019 | Walters et al. | |

(Continued)

*Primary Examiner* — El Hadji M Sall
(74) *Attorney, Agent, or Firm* — Moore & Van Allen PLLC; Anup Shrinivasan Iyer

(57) ABSTRACT

Systems, computer program products, and methods are described herein for dynamically determining performance benchmarking parameters based on reinforcement learning. The present invention is configured to implement the first distributed impact simulation model on an application; initiate a reinforcement learning algorithm on the application, wherein initiating further comprises receiving a performance assessment output for the one or more application parameters; initiate an optimization policy generation engine on the performance assessment output associated with the application parameters to generate an optimization to encode the performance assessment output into rewards and costs; initiate an implementation of the optimization policy on the application to maximize an aggregated reward calculated from the second portion of the first set of actions; automatically generate a second distributed impact simulation model using the second set of actions to be implemented on the application parameters; and implement the second distributed impact simulation model on the application.

20 Claims, 2 Drawing Sheets

(56) References Cited

U.S. PATENT DOCUMENTS

| | | |
|---|---|---|
| 10,235,734 B2 | 3/2019 | Riabov et al. |
| 10,341,420 B1 | 7/2019 | Paola et al. |
| 10,500,721 B2 | 12/2019 | Takamizawa |
| 10,503,478 B2 | 12/2019 | Maurya et al. |
| 10,540,257 B2 | 1/2020 | Tezuka et al. |
| 10,545,733 B2 | 1/2020 | Sabharwal et al. |
| 10,586,173 B2 | 1/2020 | Hammond et al. |
| 10,558,935 B2 | 2/2020 | Abu-Mostafa et al. |
| 10,635,435 B2 | 4/2020 | Bahrami et al. |
| 10,679,070 B1 | 6/2020 | Poutivski |
| 10,691,997 B2 | 6/2020 | Graves et al. |
| 2007/0006177 A1* | 1/2007 | Aiber ............... G06Q 10/10 717/136 |
| 2020/0082041 A1* | 3/2020 | Albert ............... G06N 3/084 |
| 2021/0018881 A1* | 1/2021 | Rezgui ............... G06N 5/022 |

* cited by examiner

SYSTEM FOR THRESHOLD DETECTION USING LEARNING REINFORCEMENT

FIELD OF THE INVENTION

The present invention embraces a system for dynamic parametric modeling using learning reinforcement.

BACKGROUND

Performance benchmarking tools are typically used to analyze the internal state of the software applications to identify the application parameters that might cause the performance degradation. However, continuous changes and updates to the software application may cause changes to the internal state of the software application, making implementation of static performance benchmarking tools ineffective.

Therefore, there is a need for a system for dynamic parametric modeling using reinforcement learning.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for dynamic parametric modeling using learning reinforcement is presented. The system comprising: at least one non-transitory storage device; and at least one processing device coupled to the at least one non-transitory storage device, wherein the at least one processing device is configured to: electronically retrieve a first distributed impact simulation model, wherein the first distributed impact simulation model is generated using a first set of actions; implement the first distributed impact simulation model on an application within a distributed environment, wherein implementing further comprises initiating the first set of actions on one or more application parameters; initiate a reinforcement learning algorithm on the application, wherein initiating further comprises receiving a performance assessment output for the one or more application parameters based on at least initiating the first set of actions on the one or more application parameters; initiate an optimization policy generation engine on the performance assessment output associated with the one or more application parameters to generate an optimization policy, wherein the optimization policy generation engine is configured to encode the performance assessment output into rewards and costs, wherein encoding further comprises assigning a cost to a first portion of the first set of actions and assigning a reward to a second portion of the first set of actions; initiate an implementation of the optimization policy on the application, wherein initiating further comprises generating a second set of actions based on at least the optimization policy to maximize an aggregated reward calculated from the second portion of the first set of actions; automatically generate a second distributed impact simulation model using the second set of actions to be implemented on the one or more application parameters; and implement the second distributed impact simulation model on the application, wherein implementing further comprises initiating the second set of actions on the one or more application parameters.

In some embodiments, the at least one processing device is further configured to implement the first distributed impact simulation model, wherein implementing further comprises: electronically retrieving, from a distributed data repository, one or more data records; and initiating an execution of the first set of actions on the one or more application parameters, wherein initiating further comprises initiating an execution of the application using the one or more data records.

In some embodiments, the at least one processing device is further configured to: electronically receive information associated with the application, wherein the information further comprises a first application type; scan the distributed environment for one or more additional applications associated with the first application type; and implement the second distributed impact simulation model on the one or more additional applications based on at least determining that the one or more additional applications are associated with the first application type.

In some embodiments, the at least one processing device is further configured to: electronically receive, from a computing device of a user, the first set of actions to be implemented on the one or more application parameters.

In some embodiments, the at least one processing device is further configured to: electronically receive the performance assessment output for the one or more application parameters; and initiate a probabilistic fuzzy logic engine on the performance assessment output; convert, using the probabilistic fuzzy logic engine, the performance assessment output to one or more output values; and encode, using the optimization policy generation engine, the one or more output values into the rewards and costs.

In some embodiments, the at least one processing device is further configured to: initiate the first set of actions on the one or more application parameters, wherein the one or more application parameters are associated with one or more application stress test scenarios, wherein the one or more stress test scenarios comprises at least a performance stress test, an transactional stress test, a systemic stress test, and/or an exploratory stress test.

In some embodiments, the at least one processing device is further configured to: electronically receive an indication that the first distributed simulation model is associated with at least one of the one or more application stress test scenarios; determine a first portion of the one or more application parameters associated with the at least one of the one or more application stress test scenarios; and implement the first distributed impact simulation model on the application, wherein implementing further comprises initiating the first set of actions on the first portion of the one or more application parameters.

In some embodiments, the at least one processing device is further configured to: determine, based on at least the optimization policy, a subset of the one or more application parameters; and implement the second distributed impact simulation model on the application, wherein implementing further comprises initiating the second set of actions on the subset of the one or more application parameters.

In some embodiments, the at least one processing device is further configured to: implement the first distributed impact simulation model, wherein implementing further comprises generating one or more automation scripts to execute the first set of actions on the application.

In another aspect, a computer program product for dynamic parametric modeling using learning reinforcement is presented. The computer program product comprising a non-transitory computer-readable medium comprising code causing a first apparatus to: electronically retrieve a first distributed impact simulation model, wherein the first distributed impact simulation model is generated using a first set of actions; implement the first distributed impact simulation model on an application within a distributed environment, wherein implementing further comprises initiating the first set of actions on one or more application parameters; initiate a reinforcement learning algorithm on the application, wherein initiating further comprises receiving a performance assessment output for the one or more application parameters based on at least initiating the first set of actions on the one or more application parameters; initiate an optimization policy generation engine on the performance assessment output associated with the one or more application parameters to generate an optimization policy, wherein the optimization policy generation engine is configured to encode the performance assessment output into rewards and costs, wherein encoding further comprises assigning a cost to a first portion of the first set of actions and assigning a reward to a second portion of the first set of actions; initiate an implementation of the optimization policy on the application, wherein initiating further comprises generating a second set of actions based on at least the optimization policy to maximize an aggregated reward calculated from the second portion of the first set of actions; automatically generate a second distributed impact simulation model using the second set of actions to be implemented on the one or more application parameters; and implement the second distributed impact simulation model on the application, wherein implementing further comprises initiating the second set of actions on the one or more application parameters.

In yet another aspect, a method for dynamic parametric modeling using learning reinforcement is presented. The method comprising: electronically retrieving a first distributed impact simulation model, wherein the first distributed impact simulation model is generated using a first set of actions; implementing the first distributed impact simulation model on an application within a distributed environment, wherein implementing further comprises initiating the first set of actions on one or more application parameters; initiating a reinforcement learning algorithm on the application, wherein initiating further comprises receiving a performance assessment output for the one or more application parameters based on at least initiating the first set of actions on the one or more application parameters; initiating an optimization policy generation engine on the performance assessment output associated with the one or more application parameters to generate an optimization policy, wherein the optimization policy generation engine is configured to encode the performance assessment output into rewards and costs, wherein encoding further comprises assigning a cost to a first portion of the first set of actions and assigning a reward to a second portion of the first set of actions; initiating an implementation of the optimization policy on the application, wherein initiating further comprises generating a second set of actions based on at least the optimization policy to maximize an aggregated reward calculated from the second portion of the first set of actions; automatically generating a second distributed impact simulation model using the second set of actions to be implemented on the one or more application parameters; and implementing the second distributed impact simulation model on the application, wherein implementing further comprises initiating the second set of actions on the one or more application parameters.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
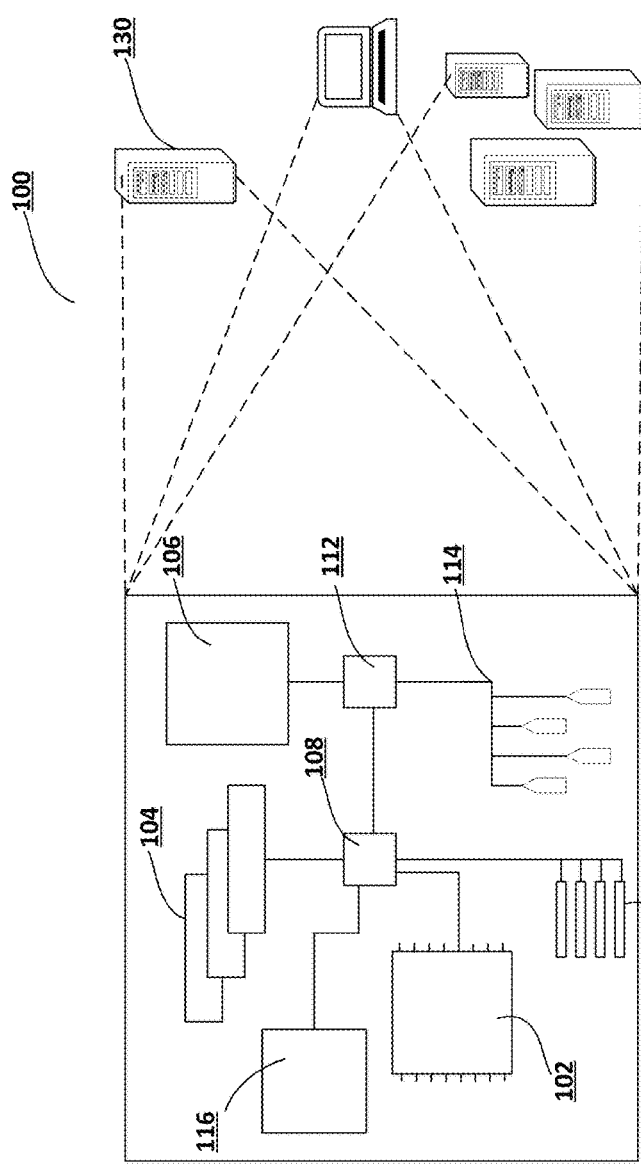
Figure 1:
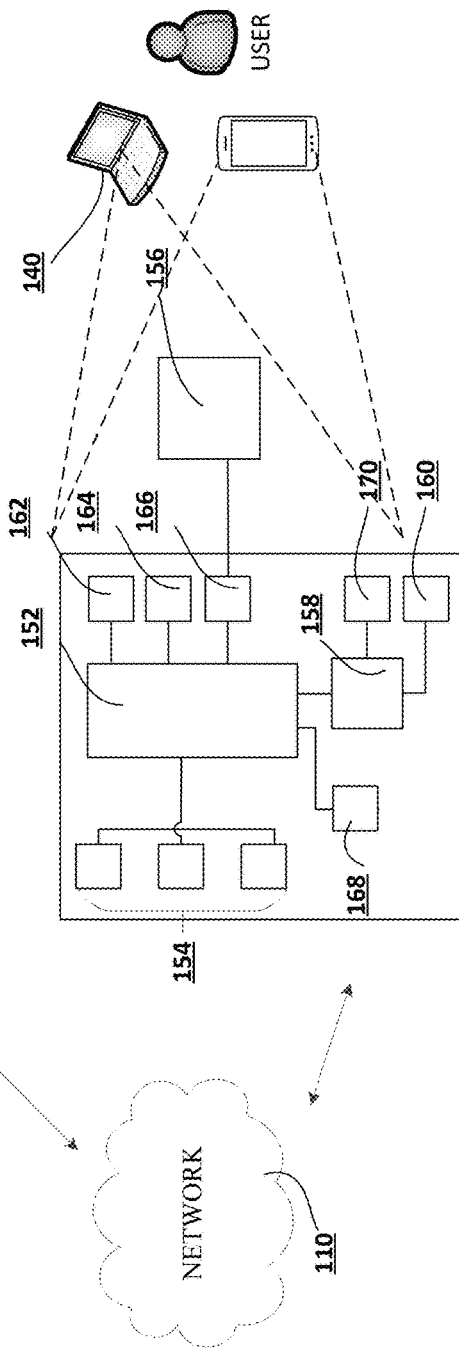
Figure 2:
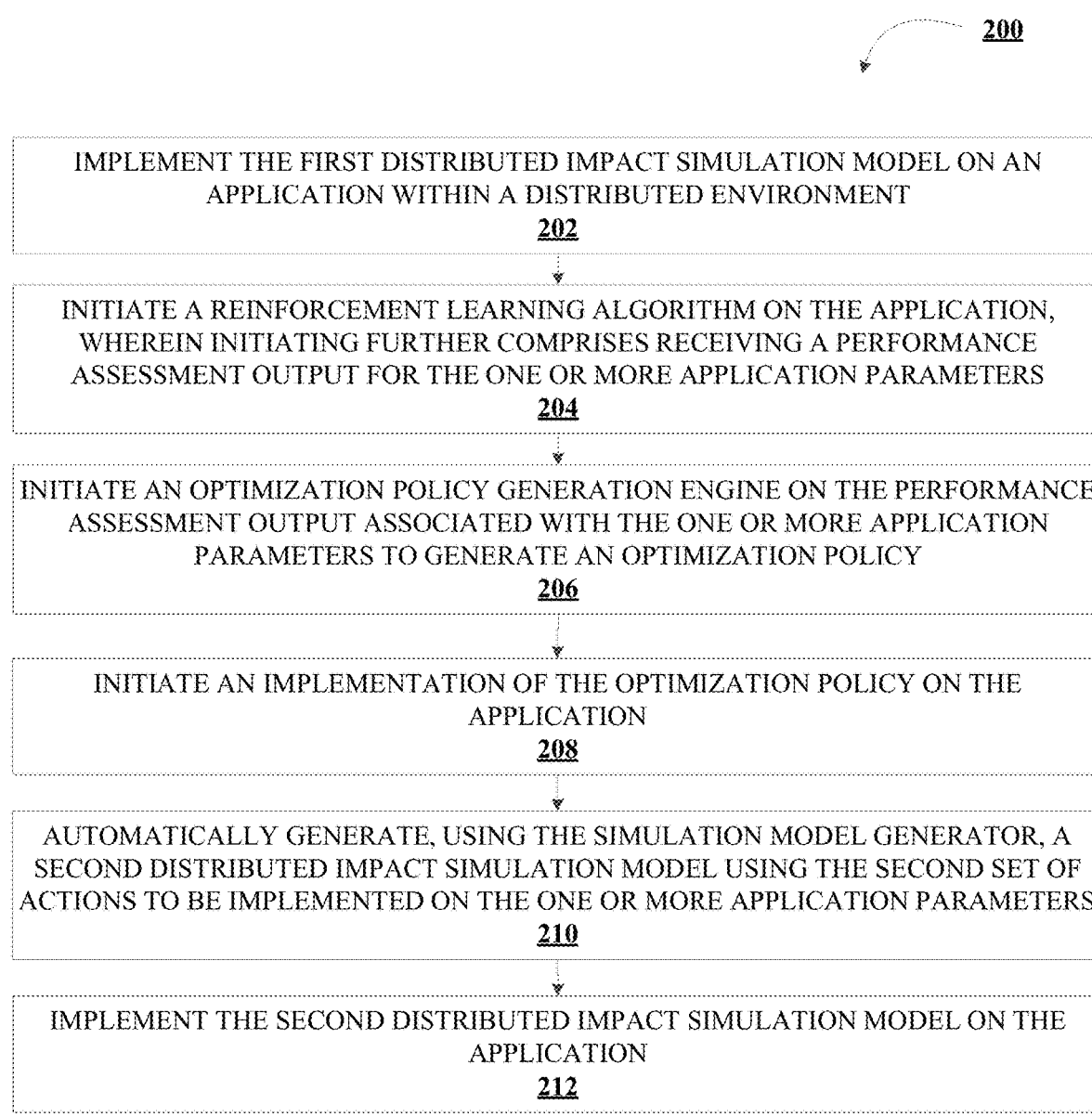

Having thus described embodiments of the invention in general terms, reference will now be made the accompanying drawings, wherein:

FIG. 1 illustrates technical components of a system for dynamic parametric modeling using learning reinforcement, in accordance with an embodiment of the invention; and FIG. 2 illustrates a process flow for dynamic parametric modeling using learning reinforcement, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

FIG. 1 presents an exemplary block diagram of the system environment for dynamic parametric modeling using learning reinforcement 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute resource transfers using one or more applications stored thereon. The one or more applications may be configured to communicate with the system 130, execute a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application, and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer-or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

A software performance benchmarking system is used to analyze the internal state of the software applications to identify the application parameters that might cause the performance degradation. Accordingly, an effective benchmarking system must not only be configured to test stability, responsiveness, effectiveness, and operational speed, but also investigate, measure, validate, or verify various portions of the software code, such as the scalability or usage. However, continuous changes and updates to the software application may cause changes to the internal state of the software application, making implementation of static performance benchmarking tools ineffective. The present invention provides the functional benefit of implementing a reinforcement learning-based performance benchmark framework using probabilistic fuzzy logic that allows the agent to learn the optimal policy for generating stress test cases leading to performance breaking point without access to performance model of the system under test in real-time. By implementing a model free reinforcement learning, the present invention identifies application parameters that can be used to define the baseline for a performance benchmarking of the application.

FIG. 2 illustrates a process flow for dynamic parametric modeling using learning reinforcement 200, in accordance with an embodiment of the invention. As shown in block 202, the process flow includes implementing the first distributed impact simulation model on an application within a distributed environment. In some embodiments, the first distributed impact simulation model may be generated using a distributed impact simulation generator. The distributed impact simulation generator may generate a computer-based, mathematical model on the basis of the first set of actions. The models generated by the distributed impact simulation generator is aimed to replicate the workings and logic of the application by using a specific set of actions that are part of the statistical descriptions of the activities involved. Accordingly, the distributed impact simulation model generator may create an impact simulation model, when implemented on the application, is capable of predicting its performance in an environment.

In some embodiments, the first distributed impact simulation model is generated based on a first set of actions. In one aspect, the first set of actions may be one or more stressors to be implemented on the application to test its performance under various conditions. For example, assuming the application is a web-based software application, examples of actions may include setting a number of concurrent users/HTTP connections, restarting ports on network switch/routers that connect the servers, removing the database to an online status and then restarting it, rebuilding an Redundant Array of Inexpensive Disks (RAID) array while the system is running, executing various processes that consume resources (CPU, memory, disk, network) both locally and on the web, and/or the like. Each action may depend on the type of application being tested and the parameters associated with the application. In some embodiments, the system may be configured to store the actions in an action database and establish a communication link to access the action database to retrieve a set of actions when needed.

In some embodiments, the system may be configured to electronically receive, from a computing device of a user, the first set of actions to be implemented on the one or more application parameters. In one aspect, the system may be configured to determine whether the user has the proper authority and authentication level to provide the first set of actions for implementation. To this extent, the system may be configured to electronically receive one or more authentication credentials from the user, via the computing device. Once received, the system may then be configured to verify the identity of the user based on the authentication credentials. In addition to verifying the identity of the user, the system may be configured to also determine whether the user has the proper authority to provide the first set of actions based on the authentication credentials. If the user has provided the proper authentication credentials verifying the identity of the user and his/her authentication level, the system may be configured to receive the first set of actions. Once received, the first set of actions are then used by the distributed impact simulation model generator to generate the first distributed impact simulation model. In some embodiments, the first set of actions are also stored in the action database.

In some embodiments, the one or more application parameters may be associated with one or more application test scenarios. In one aspect, the one or more application test scenarios may include at least a performance stress test, a transactional stress test, a systemic stress test, and/or an exploratory stress test. In some embodiments, each application test scenario may be associated with a specific set of actions. In one aspect, the set of actions associated with each application test scenario may be mutually exclusive from one another. In another aspect, there may be an overlap between the set of actions associated with each application test scenario. In some embodiments, a performance stress test scenario, among other functions, may focus on finding defects related to data locking and blocking, network issues and performance bottlenecks in an application. In some embodiments, a transactional stress test, among other functions, may focus on testing one or more transactions executed between two or more applications to fine-tune and optimize the system. In some embodiments, a systemic stress test among other functions, may be an integrated stress test which can be tested across multiple systems running on the same server. It may be used to identify issues where one application data blocks another application. It is to be understood that the application stress scenarios described herein are merely illustrative, and other application stress scenarios, in addition to those described in the above paragraph, are possible.

Next, as shown in block 204, the process flow includes implementing the first distributed impact simulation model on an application within a distributed environment. In this regard, the system may be configured to initiate the first set of actions on the one or more application parameters. To this extent, the system may be configured to generate one or more automation scripts to execute the first set of actions on the one or more application parameters. In some embodiments, the system may be configured to electronically retrieve, from a distributed data repository, one or more data records for use when implementing the first distributed impact simulation model. In response to retrieving the one or more data records, the system may be configured to initiate an execution of the first set of actions on the one or more application parameters using the one or more data records.

In some embodiments, each application stress test scenario focuses on a specific set of application parameters. In some embodiments, the system may be configured to electronically receive an indication, from a computing device of a user, that the first distributed simulation model is associated with at least one of the one or more application stress test scenarios. To effectively implement a scenario on an application, the user must have prior knowledge regarding specific application parameters that need to be tested each time a simulation model is implemented. In response, the system may be configured to determine a first portion of the one or more application parameters associated with the at least one of the one or more application stress test scenarios. Once determined, the system may then be configured to implement the first distributed impact simulation model on the application and initiate the first set of actions on the first portion of the one or more application parameters. In complex software applications, each application stress test scenario is implemented in such a way. For each application, the specific application parameters to be stressed are manually determined and then a set of actions are initiated on the application parameters. Here, this step is merely the initial step of initiating the reinforcement learning process, described in further detail below. The present invention leverages the advantages of reinforcement learning to identify how specific actions affect specific application parameters.

Next, as shown in block 206, the process flow includes initiating a reinforcement learning algorithm on the application, wherein initiating further comprises receiving a performance assessment output for the one or more application parameters. In some embodiments, the reinforcement learning algorithm may be associated with a class of algorithms for solving problems modeled as a Markov Decision Process (MDP), a discrete time stochastic control process that provide a modeling decision making in situations where outcomes are partly random and partly under the control of a decision maker. In this regard, the reinforcement learning algorithm may be composed of an agent (e.g., an autonomous entity which acts, directing its activity towards achieving goals), a set of states, and a set of actions per state (e.g., stressing application parameters), and an environment (e.g., application environment). Executing an action in a specific state provides the agent with a cost/reward (a numerical score). The goal of the agent is to maximize its total (future) reward. This is achieved by adding the maximum reward attainable from future states to the reward for achieving its current state, effectively influencing the current action by the potential future reward. This potential reward is a weighted sum of the expected values of the rewards of all future steps starting from the current state. Examples of reinforcement learning algorithms may include, but is not limited to, Q-learning, State-Action-Reward-State-Action (SARSA), Deep Q Network (DQN), Deep Deterministic Policy Gradient (DDPG), and/or the like.

In some embodiments, each time an impact simulation model is implemented on the application, the state of the application changes. For example, when the first set of actions are initiated on the application parameters, the application changes from a first state to a second state. In response, the system may be configured to receive performance assessment output from each application parameter based on at least implementing the first impact simulation model. The performance assessment output provides an indication of how the application parameters are responding to the first set of actions. In some embodiments, not all application parameters respond to the first set of actions. Some application parameters may respond negatively to a specific action. For example, an application programmed to perform effectively under heavy load may not respond positively to a lighter load. Some application parameters may not have any response to a specific action. For example, an action to test the processing capacity of the application may not affect the application's connectivity with a network switch or router. In some embodiments, the rewards and costs are determined based on the performance assessment output recorded from each application parameter that reacts to the first set of actions. In one aspect, a performance assessment output recorded from an application parameter may be considered as a reward. If no performance assessment output is recorded from an application parameter, it may be considered as a cost. In other words, if the application parameters react in any way to the first set of actions, it may be an indication that the application parameter is being stressed by at least one of the first set of actions. On the other hand, if no performance assessment output is recorded from an application parameter, it may be an indication that the application parameter is not being stressed by at least one of the first set of actions.

In some embodiments, the system may be configured to initiate a probabilistic fuzzy logic engine one the performance assessment output for the one or more application parameters. The probabilistic fuzzy logic engine may be configured to convert real-world runtime performance assessment output into one or more output values. In one aspect, the probabilistic fuzzy logic engine may be configured to minimize the effects of existing randomness in real-world systems, thereby providing an improved stochastic modeling capability. In one aspect, the converting the performance assessment output into one or more output values involves fuzzification, inference, and output processing—which involves order reduction and defuzzification. Fuzzification is the process of transforming a deterministic output into a fuzzy quantity. This is typically achieved by identifying the known crisp and deterministic quantities as completely nondeterministic and quite uncertain in nature. For example, let us assume that the application parameter being tested is memory usage. When the first set of actions is initiated on the memory usage, the corresponding performance assessment output is 72%, which indicates that the particular stressor (action) forces 72% of the memory to be used for processing. This 72% is a deterministic value. Fuzzification of this value may include converting the deterministic value to a linguistic variable such as high memory usage (adequate memory usage, or low memory usage) by the application. In response to converting the deterministic value to a linguistic value, the probabilistic fuzzy logic engine may be configured to defuzzify the linguistic value into one or more output values. The performance assessment output for each application parameter may be different based on the nature of the application parameter. For example, memory usage may be determined as a percentage value while connectivity times with network switches may be determined in time. The probabilistic fuzzy logic engine converts these real world values into output values that are in a similar format and can be quantified uniformly.

Next, as shown in block 208, the process flow includes initiating an optimization policy generation engine on the performance assessment output associated with the one or more application parameters to generate an optimization policy. In some embodiments, the optimization policy generation engine is configured to encode the performance assessment output into rewards and costs. In one aspect, the optimization policy engine may be configured to encode the one or more output values into the rewards and costs. In one aspect, the optimization policy engine may be configured to assign a cost to a first portion of the first set of actions and a reward to a second portion of the second set of actions. In other words, the rewards indicate that at least the first portion of the first set of actions stress at least one of the one or more application parameters to generate a performance assessment output, while the costs indicate that none of the actions stress the application parameters enough to generate a performance assessment output.

Next, as shown in block 210, the process flow includes initiating an implementation of the optimization policy on the application. In some embodiments, the system may be configured to generate a second set of actions based on at least the optimization policy to maximize an aggregated reward calculated from the second portion of the first set of actions. In one aspect, the second set of actions may include the first set of action and an additional set of actions retrieved from the action database. In another aspect, the second set of actions may be a subset of the first set of actions. In yet another aspect, the second set of actions may be a completely independent set of actions from the first set of actions. In still other aspects, the second set of actions may be identical to the first set of actions, but with different values. For example, if the first set of actions included loading the application to process X no. of records each cycle, the second set of actions may include loading the application to process Y no. of records each cycle.

Next, as shown in block 212, the process flow includes automatically generating a second distributed impact simulation model using the second set of actions to be implemented on the one or more application parameters.

Next, as shown in block 214, the process flow includes implementing the second distributed impact simulation model on the application. In this regard, the system may be configured to initiate the second set of actions on the one or more application parameters. In some embodiments, the system may be configured to determine, based on at least the optimization policy, a subset of the one or more application parameters. This may be because only the subset of the one or more application parameters have provided any tangible performance assessment output in response to being stressed by the first set of actions. So, in the next iteration, instead of having the second set of actions to be implemented on all of the application parameters again, the system may be configured to implement the second set of actions on the subset of the one or more application parameters.

In some embodiments, the cycle of implementing reinforcement learning and the probabilistic fuzzy logic engine to generate and implement different impact assessment simulation models may be an iterative process. At each iteration, the reinforcement learning algorithm generates a value function that represents how good the current state is. Here, the value function denotes whether the right set of actions are initiated on the application parameters for parametric modeling. In one aspect, among all possible value-functions, there exist an optimal value function that has higher value than other functions for all states. The reinforcement learning process is implemented iteratively to allow the value function to converge to the optimal value. Typically, the optimal value function drives the decision to generate the optimal set of actions to be initiated on the application parameters. In some embodiments, in addition to iteratively determining the optimal value function, the reinforcement learning algorithm may be configured to implement policy iteration, where instead of improving the value-function estimate, the algorithm focus on re-defining the set of actions at each step and compute the value according to this new policy until the policy converges. In some embodiments, the reinforcement learning algorithm performs both value iteration and policy iteration to arrive at the optimal set of actions to be initiated on the application parameters. Based on the optimal set of actions, the system may be configured to generate the optimal impact assessment simulation model to be implemented on the application.

In some embodiments, the system may be configured to electronically receive information associated with the application, wherein the information further comprises a first application type. In response, the system may be configured to scan the distributed environment for one or more additional applications associated with the first application type. In response to determining the one or more additional applications, the system may be configured to implement the second distributed impact simulation model on the one or more additional applications based on at least determining that the one or more additional applications are associated with the first application type. In other words, the optimal set of actions remain optimal to every application associated with a similar application type.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for dynamic parametric modeling using learning reinforcement, the system comprising:
    at least one non-transitory storage device; and
    at least one processing device coupled to the at least one non-transitory storage device, wherein the at least one processing device is configured to:
    electronically retrieve a first distributed impact simulation model, wherein the first distributed impact simulation model is generated using a first set of actions;
    implement the first distributed impact simulation model on an application within a distributed environment, wherein implementing further comprises initiating the first set of actions on one or more application parameters;
    initiate a reinforcement learning algorithm on the application, wherein initiating further comprises receiving a performance assessment output for the one or more application parameters based on at least initiating the first set of actions on the one or more application parameters;
    initiate an optimization policy generation engine on the performance assessment output associated with the one or more application parameters to generate an optimization policy, wherein the optimization policy generation engine is configured to encode the performance assessment output into rewards and costs, wherein encoding further comprises assigning a cost to a first portion of the first set of actions and assigning a reward to a second portion of the first set of actions;
    initiate an implementation of the optimization policy on the application, wherein initiating further comprises generating a second set of actions based on at least the optimization policy to maximize an aggregated reward calculated from the second portion of the first set of actions;
    automatically generate a second distributed impact simulation model using the second set of actions to be implemented on the one or more application parameters; and
    implement the second distributed impact simulation model on the application, wherein implementing further comprises initiating the second set of actions on the one or more application parameters.

2. The system of claim 1, wherein the at least one processing device is further configured to implement the first distributed impact simulation model, wherein implementing further comprises:

electronically retrieving, from a distributed data repository, one or more data records; and initiating an execution of the first set of actions on the one or more application parameters, wherein initiating further comprises initiating an execution of the application using the one or more data records.

3. The system of claim 1, wherein the at least one processing device is further configured to:

electronically receive information associated with the application, wherein the information further comprises a first application type;

scan the distributed environment for one or more additional applications associated with the first application type; and implement the second distributed impact simulation model on the one or more additional applications based on at least determining that the one or more additional applications are associated with the first application type.

4. The system of claim 1, wherein the at least one processing device is further configured to:

electronically receive, from a computing device of a user, the first set of actions to be implemented on the one or more application parameters.

5. The system of claim 1, wherein the at least one processing device is further configured to:

electronically receive the performance assessment output for the one or more application parameters; and initiate a probabilistic fuzzy logic engine on the performance assessment output;

convert, using the probabilistic fuzzy logic engine, the performance assessment output to one or more output values; and encode, using the optimization policy generation engine, the one or more output values into the rewards and costs.

6. The system of claim 1, wherein the at least one processing device is further configured to:

initiate the first set of actions on the one or more application parameters, wherein the one or more application parameters are associated with one or more application stress test scenarios, wherein the one or more stress test scenarios comprises at least a performance stress test, an transactional stress test, a systemic stress test, and/or an exploratory stress test.

7. The system of claim 6, wherein the at least one processing device is further configured to:

electronically receive an indication that the first distributed simulation model is associated with at least one of the one or more application stress test scenarios;

determine a first portion of the one or more application parameters associated with the at least one of the one or more application stress test scenarios; and implement the first distributed impact simulation model on the application, wherein implementing further comprises initiating the first set of actions on the first portion of the one or more application parameters.

8. The system of claim 1, wherein the at least one processing device is further configured to:

determine, based on at least the optimization policy, a subset of the one or more application parameters; and implement the second distributed impact simulation model on the application, wherein implementing further comprises initiating the second set of actions on the subset of the one or more application parameters.

9. The system of claim 1, wherein the at least one processing device is further configured to:

implement the first distributed impact simulation model, wherein implementing further comprises generating one or more automation scripts to execute the first set of actions on the application.

10. A computer program product for dynamic parametric modeling using learning reinforcement, the computer program product comprising a non-transitory computer-readable medium comprising code causing a first apparatus to:

electronically retrieve a first distributed impact simulation model, wherein the first distributed impact simulation model is generated using a first set of actions;

implement the first distributed impact simulation model on an application within a distributed environment, wherein implementing further comprises initiating the first set of actions on one or more application parameters;

initiate a reinforcement learning algorithm on the application, wherein initiating further comprises receiving a performance assessment output for the one or more application parameters based on at least initiating the first set of actions on the one or more application parameters;

initiate an optimization policy generation engine on the performance assessment output associated with the one or more application parameters to generate an optimization policy, wherein the optimization policy generation engine is configured to encode the performance assessment output into rewards and costs, wherein encoding further comprises assigning a cost to a first portion of the first set of actions and assigning a reward to a second portion of the first set of actions;

initiate an implementation of the optimization policy on the application, wherein initiating further comprises generating a second set of actions based on at least the optimization policy to maximize an aggregated reward calculated from the second portion of the first set of actions;

automatically generate a second distributed impact simulation model using the second set of actions to be implemented on the one or more application parameters; and implement the second distributed impact simulation model on the application, wherein implementing further comprises initiating the second set of actions on the one or more application parameters.

11. The computer program product of claim 10, wherein the first apparatus is further configured to implement the first distributed impact simulation model, wherein implementing further comprises:

electronically retrieving, from a distributed data repository, one or more data records; and initiating an execution of the first set of actions on the one or more application parameters, wherein initiating further comprises initiating an execution of the application using the one or more data records.

12. The computer program product of claim 10, wherein the first apparatus is further configured to:

electronically receive information associated with the application, wherein the information further comprises a first application type;

scan the distributed environment for one or more additional applications associated with the first application type; and implement the second distributed impact simulation model on the one or more additional applications based on at least determining that the one or more additional applications are associated with the first application type.

13. The computer program product of claim 10, wherein the first apparatus is further configured to:
electronically receive, from a computing device of a user, the first set of actions to be implemented on the one or more application parameters.

14. The computer program product of claim 10, wherein the first apparatus is further configured to:
electronically receive the performance assessment output for the one or more application parameters; and
initiate a probabilistic fuzzy logic engine on the performance assessment output;
convert, using the probabilistic fuzzy logic engine, the performance assessment output to one or more output values; and
encode, using the optimization policy generation engine, the one or more output values into the rewards and costs.

15. The computer program product of claim 10, wherein the first apparatus is further configured to:
initiate the first set of actions on the one or more application parameters, wherein the one or more application parameters are associated with one or more application stress test scenarios, wherein the one or more stress test scenarios comprises at least a performance stress test, an transactional stress test, a systemic stress test, and/or an exploratory stress test.

16. The computer program product of claim 15, wherein the first apparatus is further configured to:
electronically receive an indication that the first distributed simulation model is associated with at least one of the one or more application stress test scenarios;
determine a first portion of the one or more application parameters associated with the at least one of the one or more application stress test scenarios; and
implement the first distributed impact simulation model on the application, wherein implementing further comprises initiating the first set of actions on the first portion of the one or more application parameters.

17. The computer program product of claim 10, wherein the first apparatus is further configured to:
determine, based on at least the optimization policy, a subset of the one or more application parameters; and
implement the second distributed impact simulation model on the application, wherein implementing further comprises initiating the second set of actions on the subset of the one or more application parameters.

18. The computer program product of claim 10, wherein the first apparatus is further configured to:
implement the first distributed impact simulation model, wherein implementing further comprises generating one or more automation scripts to execute the first set of actions on the application.

19. A method for dynamic parametric modeling using learning reinforcement, the method comprising:
electronically retrieving a first distributed impact simulation model, wherein the first distributed impact simulation model is generated using a first set of actions;
implementing the first distributed impact simulation model on an application within a distributed environment, wherein implementing further comprises initiating the first set of actions on one or more application parameters;
initiating a reinforcement learning algorithm on the application, wherein initiating further comprises receiving a performance assessment output for the one or more application parameters based on at least initiating the first set of actions on the one or more application parameters;
initiating an optimization policy generation engine on the performance assessment output associated with the one or more application parameters to generate an optimization policy, wherein the optimization policy generation engine is configured to encode the performance assessment output into rewards and costs, wherein encoding further comprises assigning a cost to a first portion of the first set of actions and assigning a reward to a second portion of the first set of actions;
initiating an implementation of the optimization policy on the application, wherein initiating further comprises generating a second set of actions based on at least the optimization policy to maximize an aggregated reward calculated from the second portion of the first set of actions;
automatically generating a second distributed impact simulation model using the second set of actions to be implemented on the one or more application parameters; and
implementing the second distributed impact simulation model on the application, wherein implementing further comprises initiating the second set of actions on the one or more application parameters.

20. The method of claim 19, wherein the method further comprises implementing the first distributed impact simulation model, wherein implementing further comprises:
electronically retrieving, from a distributed data repository, one or more data records; and
initiating an execution of the first set of actions on the one or more application parameters, wherein initiating further comprises initiating an execution of the application using the one or more data records.

* * * * *